US010519856B2

(12) United States Patent
Tominaga et al.

(10) Patent No.: US 10,519,856 B2
(45) Date of Patent: Dec. 31, 2019

(54) POWER TRAIN

(71) Applicant: TOYOTA JIDOSHA KABUSHIKI KAISHA, Toyota-shi (JP)

(72) Inventors: Satoshi Tominaga, Susono (JP); Daisuke Tokozakura, Susono (JP); Takahiro Shiina, Mumazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/894,383

(22) Filed: Feb. 12, 2018

(65) Prior Publication Data

US 2018/0230901 A1 Aug. 16, 2018

(30) Foreign Application Priority Data

Feb. 14, 2017 (JP) .................................. 2017-024849

(51) Int. Cl.
| F02B 77/11 | (2006.01) |
| F01P 3/02 | (2006.01) |
| F16H 57/025 | (2012.01) |
| B60K 6/48 | (2007.10) |
| F16H 57/02 | (2012.01) |

(52) U.S. Cl.
CPC ................ F02B 77/11 (2013.01); F01P 3/02 (2013.01); F16H 57/025 (2013.01); B60K 6/48 (2013.01); B60Y 2200/92 (2013.01); B60Y 2410/114 (2013.01); F16H 2057/0203 (2013.01); Y10S 903/902 (2013.01)

(58) Field of Classification Search
CPC ........... F02B 77/11; F01P 3/02; F16H 57/025; B60K 6/48
See application file for complete search history.

(56) References Cited

U.S. PATENT DOCUMENTS

| 7,096,846 B1* | 8/2006 | Dondlinger ............ F01M 11/02 |
| | | 123/195 R |
| 2003/0019313 A1* | 1/2003 | Ibamoto .................. B60K 6/48 |
| | | 74/339 |
| 2004/0168657 A1* | 9/2004 | Gooijer ................. F02B 75/047 |
| | | 123/78 F |
| 2004/0171449 A1 | 9/2004 | Oishi et al. |
| 2010/0236504 A1 | 9/2010 | Yamazaki |
| 2013/0146376 A1 | 6/2013 | Nam et al. |

FOREIGN PATENT DOCUMENTS

| JP | 2002-137640 A | 5/2002 |
| JP | 2007-9918 A | 1/2007 |
| JP | 2008-281011 A | 11/2008 |
| JP | 2012-72749 A | 4/2012 |
| JP | 2013-119384 | 6/2013 |
| KR | 10-0248160 B1 | 4/2000 |
| WO | WO 03/085285 A1 | 10/2003 |
| WO | WO 2009/054154 A1 | 4/2009 |

* cited by examiner

Primary Examiner — Kevin A Lathers
(74) Attorney, Agent, or Firm — Oblon, McClelland, Maier & Neustadt, L.L.P.

(57) ABSTRACT

A power train includes: an engine including an engine case; a transmission including a transmission case that is fastened to the engine case; an electric motor provided inside the transmission case; and a heat insulator provided between the engine case and the transmission case, and being lower than thermal conductivity of the engine case and thermal conductivity of the transmission case.

12 Claims, 13 Drawing Sheets

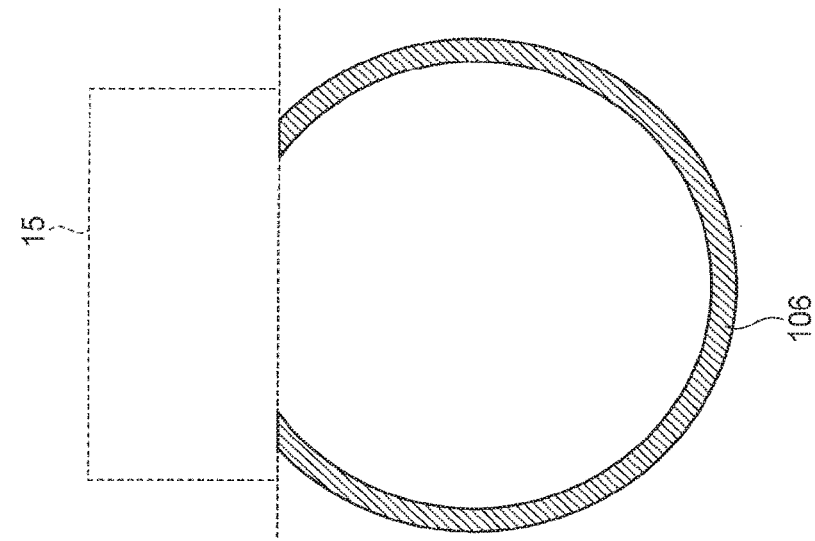
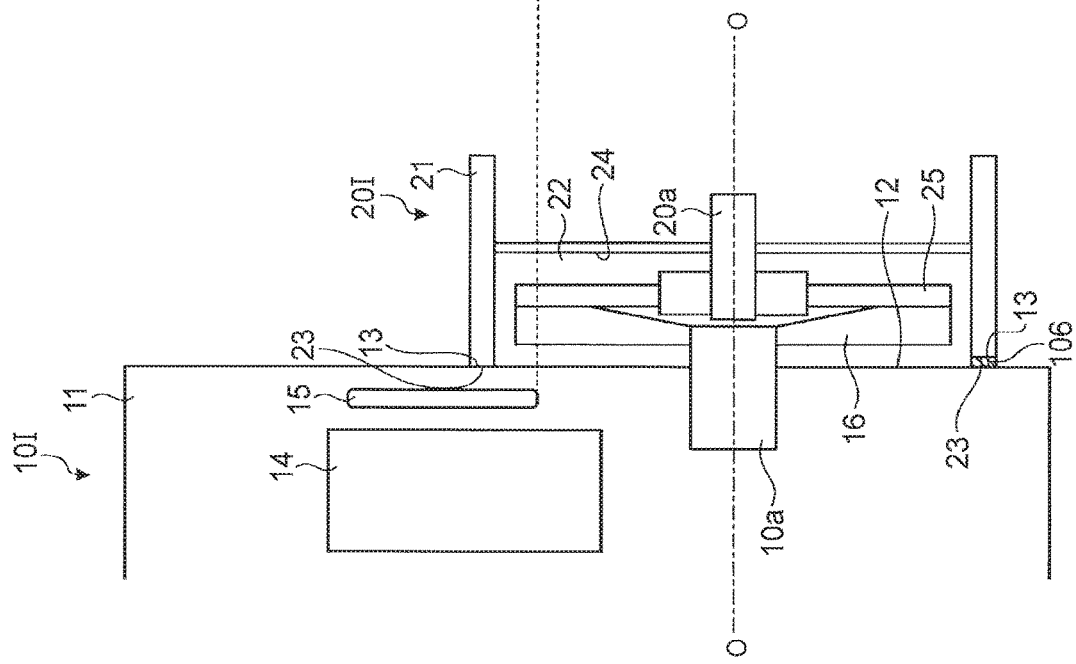

POWER TRAIN

INCORPORATION BY REFERENCE

The disclosure of Japanese Patent Application No. 2017-024849 filed on Feb. 14, 2017 including the specification, drawings and abstract is incorporated herein by reference in its entirety.

BACKGROUND

Technical Field

The disclosure relates to a power train in which an engine case and a transmission case are fastened to each other.

Description of Related Art

According to a technology described in, for example, Japanese Patent Application Publication No. 2013-119384 (JP 2013-119384 A), in a vehicle including an engine and a transmission, an encapsulating structure is arranged around above and below the engine and the transmission to control inflow and outflow of air. Thus, noise is reduced, warm-up is promoted, and a period of time for heat retention is extended by the encapsulation while ensuring cooling performance, thereby optimizing heat control of an engine room.

SUMMARY

In the above-mentioned conventional technology, the engine and the transmission are entirely encapsulated so as to reduce heat dissipation from an engine case and a transmission case to air. However, the engine case and the transmission case have large areas of portions that are fastened to each other by metal. Therefore, in these large areas, thermal conduction happens through solid bodies and air. This kind of phenomenon can happen regardless of a driving system, and is particularly remarkable in a power train of a hybrid vehicle (HV) in which a temperature difference is likely to happen between an engine and a transmission.

When a vehicle travels, there is a case where the vehicle first travels while an engine is activated, and, after temperature of an engine case becomes higher than that of a transmission case, the engine and the vehicle are stopped, and then the vehicle travels again a few hours later by activating the engine. In such a case, heat transfers from the engine case to the transmission case while the engine and the vehicle are stopped, thus causing a drop of temperature of the engine. Therefore, when the engine is started again a few hours later, the fuel combustion state becomes unstable, which makes it difficult to improve fuel economy.

Further, when an HV travels, there is a case where the HV travels with a high load while an engine is activated. In such a case, temperature of the engine also becomes higher than that of a transmission. Therefore, because of thermal conduction from an engine case to a transmission case, an effect of cooling an electric system that needs to be cooled, such as an electric motor (MG), provided inside the transmission case can be reduced.

The disclosure is a power train that is able to restrain thermal conduction from an engine case to a transmission case.

An aspect of the disclosure is a power train. The power train includes an engine including an engine case; a transmission including a transmission case that is fastened to the engine case; an electric motor provided inside the transmission case; and a heat insulator provided between the engine case and the transmission case, and being lower than thermal conductivity of the engine case and thermal conductivity of the transmission case.

With this structure, thermal conduction is restrained on a surface of the transmission case on the engine case side, thermal conduction from air between the engine case and the transmission case to the transmission case is reduced, and an increase in temperature of electric parts such as the electric motor is restrained, thereby restraining electrical loss.

The heat insulator may include a first heat insulator, the first heat insulator may be provided between the engine case and the transmission case.

With this structure, it is possible to restrain direct thermal conduction from the engine case to the transmission case.

The power train may include a crankshaft provided in the engine; a flywheel connected with the crankshaft; and a damper connected with the flywheel.

The heat insulator may include a second heat insulator, the second heat insulator may be provided on a first confronting surface of the engine case, the first confronting surface faces the flywheel.

With this structure, thermal conduction from the engine case to air between the engine case and the transmission case is restrained, thereby restraining temperature increase of the air.

The heat insulator may include a third heat insulator configured to integrate the first heat insulator with the second heat insulator.

According to this structure, it is possible to reduce the number of components that structure the power train. At the same time, it is possible to improve assembly of the engine case and the transmission case.

The heat insulator may include a forth heat insulator. The forth heat insulator may be provided on a second confronting surface of the transmission case, which faces the crankshaft, the flywheel, and the damper.

With this structure, it is possible to restrain thermal conduction from air between the engine case and the transmission case to the transmission case, or thermal conduction from the transmission case to the air. Therefore, it is possible to restrain temperature increase in the transmission case. Also, when temperature of the transmission case is high, it is possible to improve heat retention of the transmission case and restrains mechanical loss.

The heat insulator may include a fifth heat insulator configured to integrate the first heat insulator with the forth heat insulator.

With this structure, it is possible to reduce the number of components that structure the power train, and it is also possible to improve assembly of the engine case and the transmission case.

In the power train according the disclosure, by providing the heat insulator, which has lower thermal conductivity than thermal conductivity of the engine case and the transmission case, between the engine case and transmission case, it is possible to restrain thermal conduction from the engine case to the transmission case.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12A is a schematic view of a side section of fastened portions of an engine and a transmission according to a ninth example of the disclosure;

FIG. 12B is a schematic plan view of a heat insulator in FIG. 12A; and

DETAILED DESCRIPTION OF EMBODIMENTS

Figure 1:
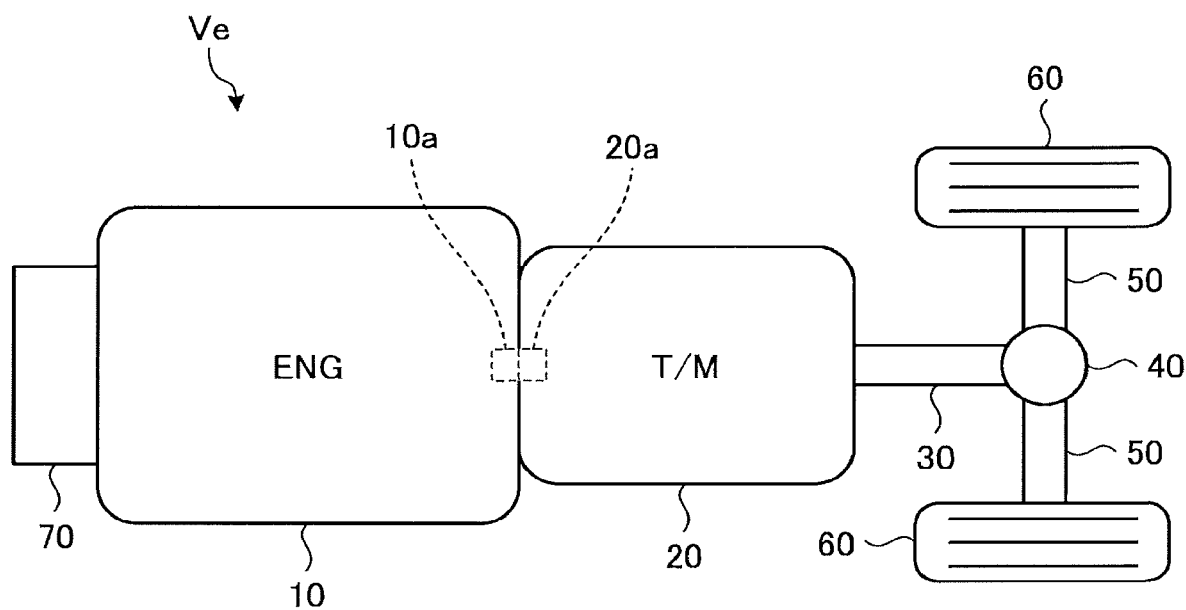
FIG. 1 is a schematic view of a structure of a vehicle according to a first embodiment of the disclosure.

Hereinafter, embodiments of the disclosure are explained with reference to the drawings. In all of the drawings of the embodiments described below, the same or corresponding parts share the same reference numerals. Also, the disclosure is not limited to the embodiments explained below.

First of all, a vehicle according to the first embodiment of the disclosure is explained. FIG. 1 is a schematic view of a structure of a vehicle according to the first embodiment. The vehicle Ve according to the first embodiment includes an engine (ENG) 10 serving as a power source, a transmission (T/M) 20, an output shaft 30, a differential 40, axles 50, and driving wheels 60 as a power train. The engine 10 includes a starting device 70 that starts the engine 10. The starting device 70 is connected with a battery through an inverter (neither of them are shown) so as be able to transfer electricity between them. The starting device 70 is a known starting device provided with a starter motor that consumes electricity of the battery and cranks the engine 10.

The engine 10 is a gasoline engine, a diesel engine, and so on. The transmission 20 is a known transmission that is able to change a transmission gear ratio automatically or manually and also set a neutral state. A crankshaft 10a of the engine 10 is connected with an input shaft 20a of the transmission 20 through a hydraulic transmission (torque converter) so as to be able to transmit power. The hydraulic transmission generates a torque amplification effect by using a fluid flow. Also, the engine 10 and the transmission 20 are directly fastened to each other by, for example, a bolt (not shown). Power (engine torque) output from the crankshaft 10a of the engine 10 is input into the transmission 20 from the input shaft 20a and transmitted to the output shaft 30. Thus, the power train from the engine 10 to the transmission 20 is structured. The output shaft 30 is connected with the axles 50 through the differential 40 so as to be able to transmit power. Therefore, transmission torque output from the engine 10 to the output shaft 30 through the transmission 20 is transmitted to the driving wheels 60 through the differential 40 and the axles 50.

Figure 2:
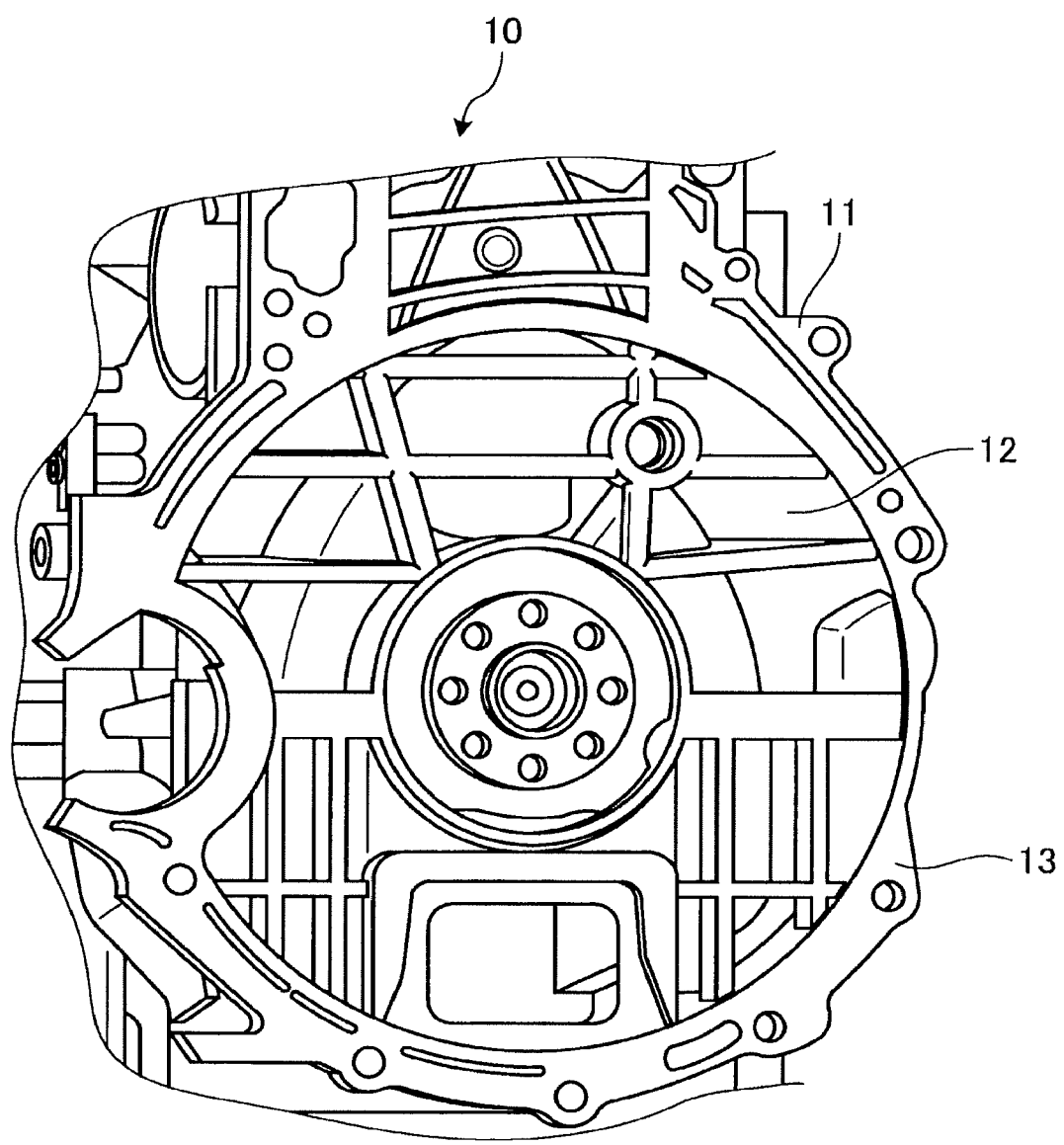
FIG. 2 is a perspective view of an engine block on a side that is fastened to a transmission housing according to the first embodiment of the disclosure.
Figure 3:
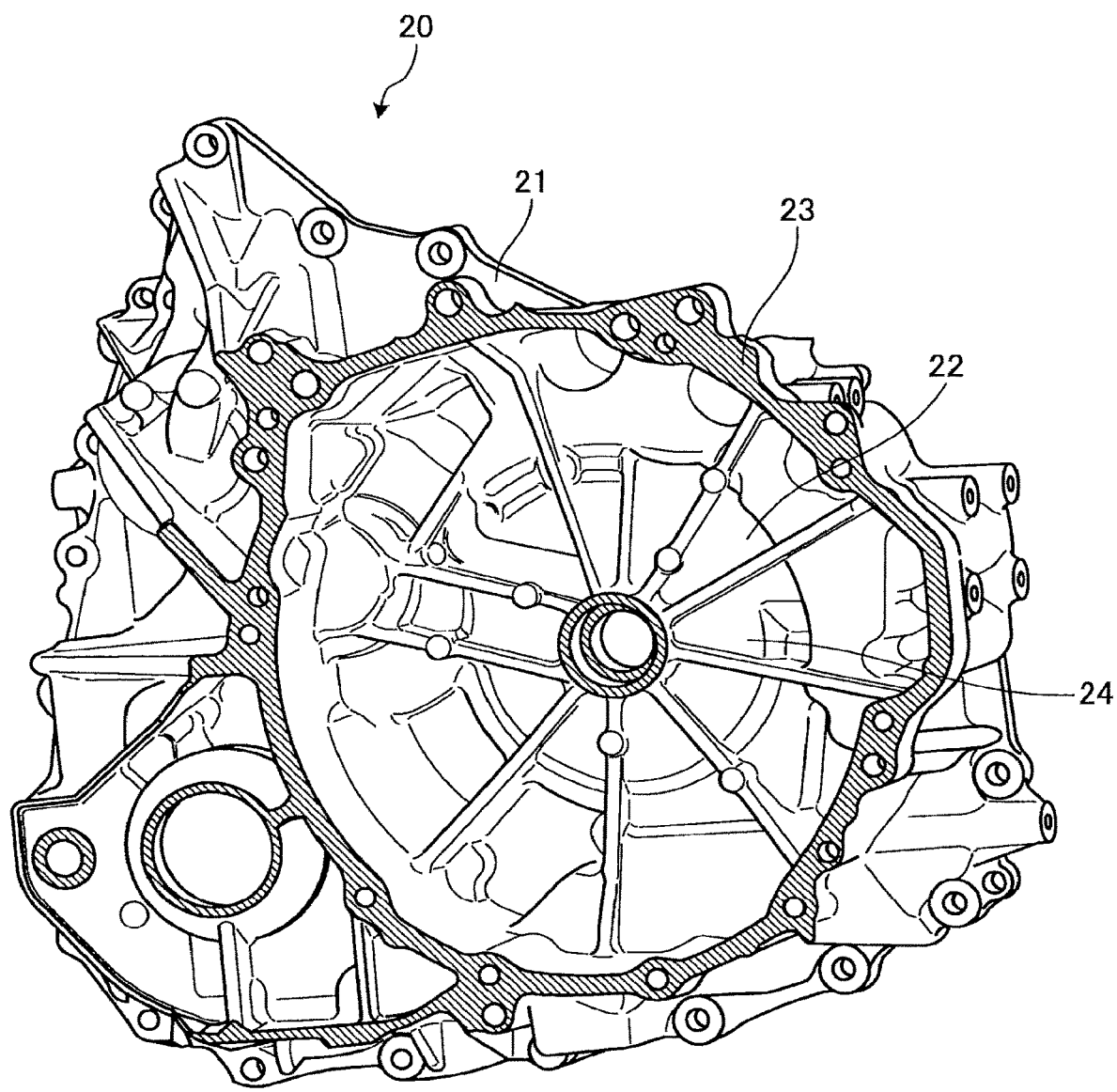
FIG. 3 is a perspective view of the transmission housing on a side that is fastened to the engine block according to the first embodiment of the disclosure.

FIG. 2 is a perspective view of an engine block of the engine 10 on a side that is fastened to a transmission housing according to the first embodiment. FIG. 3 is a perspective view of the transmission housing of the transmission 20 on a side that is fastened to the engine block according to the first embodiment. As shown in FIG. 2, the engine 10 includes the engine block 11 serving as an engine case. On the side of the engine 10 fastened to the transmission 20, a block surface 12 of the engine block 11, and a mating surface 13, which is a part fastened directly to the transmission 20, are formed.

Further, as shown in FIG. 3, the transmission 20 has the transmission housing 21 serving as the transmission case. In the transmission housing 21 of the transmission 20, a mating surface 23 is formed, which is fastened directly to the engine block 11. This means that the mating surface 13 of the engine block 11 and the mating surface 23 of the transmission 20 are formed so that they are fastened to one another.

In a state where the mating surface 13 of the engine block 11 and the mating surface 23 of the transmission 20 are fastened to each other, sealed space is formed between the block surface 12, serving as a surface of the engine case, and a housing surface 24, serving as a surface of the transmission case. The sealed space forms a damper chamber 22 in which later-described flywheel and damper are housed. This means that the engine block 11 of the engine 10 and the transmission housing 21 of the transmission 20 are fastened to each other, thereby structuring a power train in which engine torque is transmitted from the crankshaft 10a to the input shaft 20a.

In the first embodiment, a heat insulator is provided between the engine block 11 and the transmission housing 21. The heat insulator serves as a low thermal conductor having lower thermal conductivity than that of the engine block 11 and the transmission housing 21. Here, between the engine block 11 and the transmission housing 21 means at least a part of space between the block surface 12 and the mating surface 13 of the engine block 11, and the housing surface 24 and the mating surface 23 of the transmission housing 21. Hereinafter, examples of installation of the heat insulator according to the first embodiment are explained.

Figure 4:
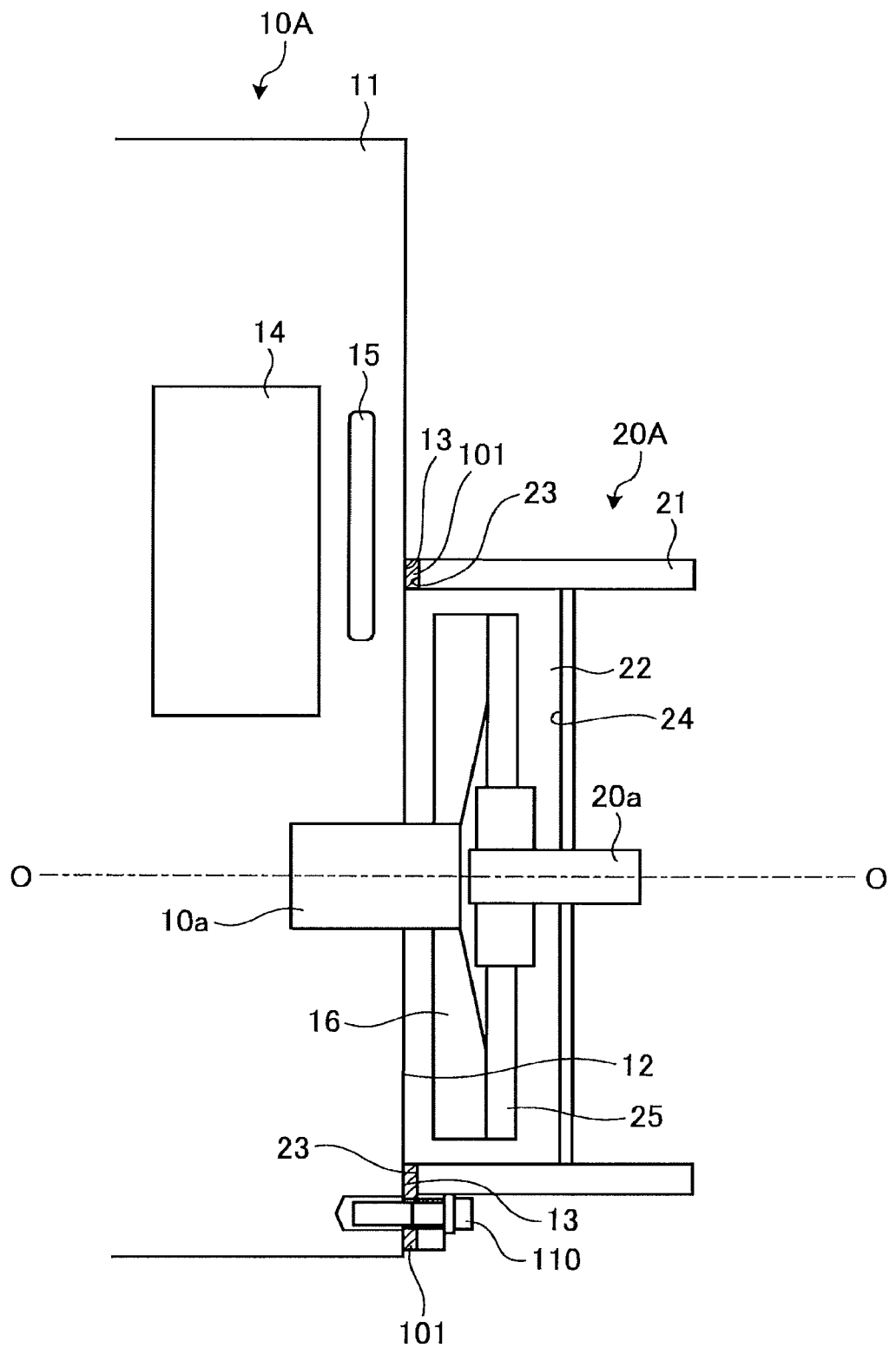
FIG. 4 is a schematic view of a side section of fastened portions of an engine and a transmission according to a first example of the disclosure.

FIG. 4 is a schematic view of a side section of fastened portions of an engine 10A and a transmission 20A according to the first example. As shown in FIG. 4, inside an engine block 11 of the engine 10A, a combustion chamber 14 and a water jacket 15 are provided. Further, a crankshaft 10a is connected with a flywheel 16. The flywheel 16 is connected with a damper 25 that synchronizes an input shaft 20a of the transmission 20A. The flywheel 16 and the damper 25 are able to rotate about an axis of rotation O of the crankshaft 10a and the input shaft 20a. The flywheel 16 and the damper 25 are provided in a rotatable state inside a damper chamber 22 that is made of space between a block surface 12 and a housing surface 24 where the engine block 11 and a transmission housing 21 are fastened to each other. The engine block 11 and the transmission housing 21 are fastened to each other by, for example, a fastening bolt 110.

In the first example, a heat insulator 101 is provided in a part between a mating surface 13 of the engine block 11 and a mating surface 23 of the transmission housing 21. The heat insulator 101 (first heat insulator) is also provided in a part of the fastening bolt 110 between the mating surface 13 and the mating surface 23.

The heat insulator 101 serving as a low thermal conductor is made from a low thermal conductive material having high heat insulating performance. Also, it is preferred to use the material that hardly reduces axial force of the fastening bolt 110 while maintaining heat insulating performance even in a state where fastening force (surface pressure) between the engine block 11 and the transmission housing 21 is applied. In other words, for the heat insulator 101, it is preferred to use a material that has no shrinkage, or so-called creep, when cooled under a high surface pressure environment. Also, as the heat insulator 101, it is preferred to use a thin material with a thickness smaller than, for example, 3 mm. By setting the thickness of the heat insulator 101 to 3 mm or smaller, it is possible to keep a length of a vehicle Ve within a given range without extending a shaft length of the power train.

Further, the engine block 11 and the transmission housing 21 are made of die casting of metal with thermal conductivity of, for example, 100 W/mK, or aluminum (Al) to be more specific. On the contrary, for the heat insulator 101, it is preferred to use a material having thermal conductivity lower than that of the engine block 11 and the transmission housing 21, preferably 1.0 W/mK or lower, which is one hundredth or less of the thermal conductivity of the engine block 11 and the transmission housing 21. To be specific, a material used for the heat insulator 101 includes epoxy resin, unsaturated polyester, melamine resin, and phenol resin, which are reinforced by glass fiber, ceramics with high surface pressure resistance, and a porous material having air layers inside. Also, the heat insulator 101 may have various film structures such as a structure with a single film of a heat insulation material, a structure made of a plurality of stacked layers of films made of a heat insulation material, and a structure in which at least one of the layers of films is made of a heat insulation material and the rest of the films are made of a non-heat insulation material. Further, an adhesive or the like may be applied to at least one surface of the heat insulator 101.

Metal is directly fastened to metal between the mating surface 13 of the engine block 11 and the mating surface 23 of the transmission housing 21, and thermal conduction from metal to metal (hereinafter, referred to as solid body thermal conduction) happens easily. According to the first example, by interposing the heat insulator 101, which has lower thermal conductivity than that of the engine block 11 and the transmission housing 21, at the portion where the solid body thermal conduction is likely to happen, it is possible to restrain the thermal conduction from the engine block 11 to the transmission housing 21. According to this, it is possible to improve heat retention of the engine 10A.

Figure 5:
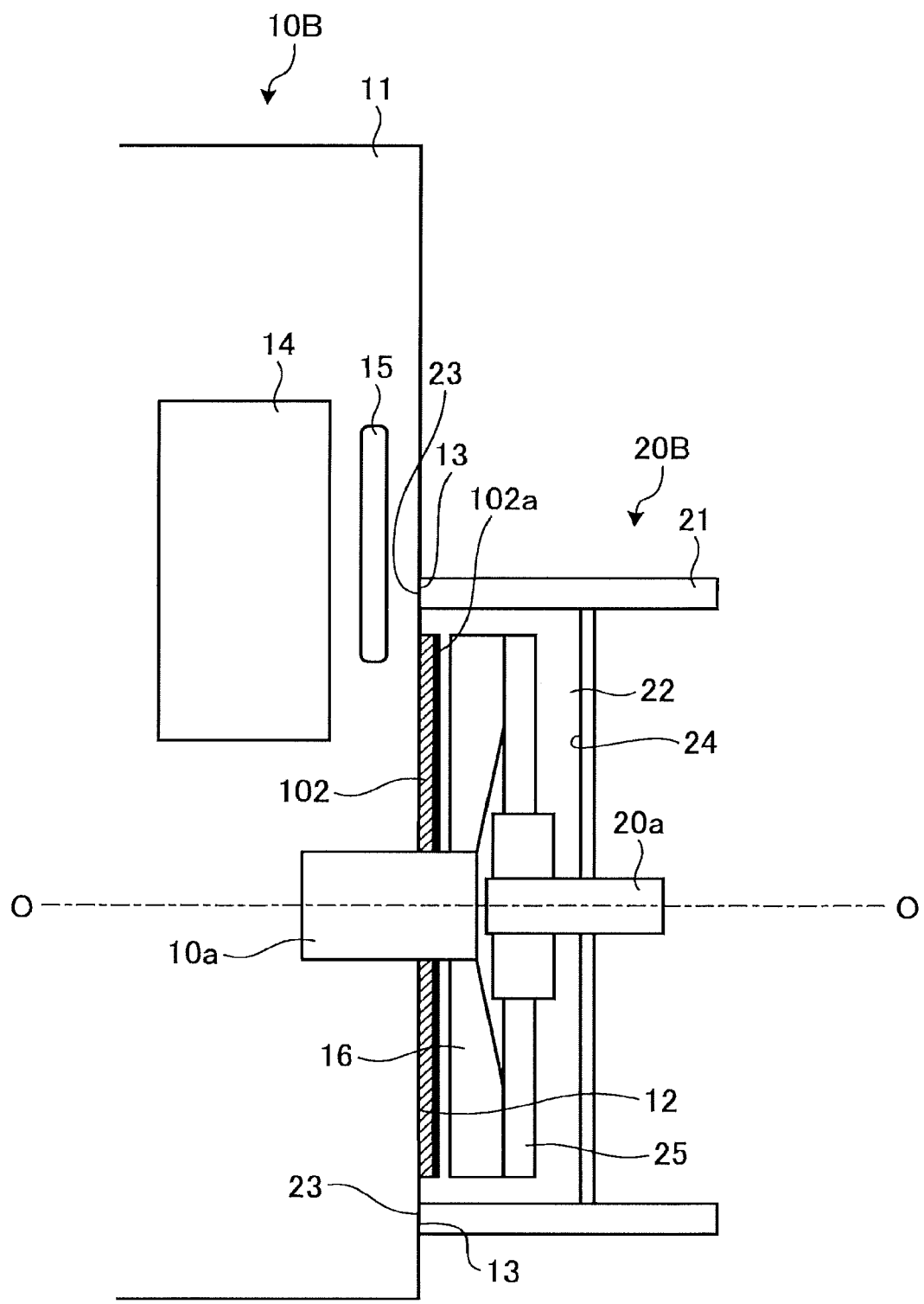
FIG. 5 is a schematic view of a side section of fastened portions of an engine and a transmission according to a second example of the disclosure.

Next, the second example is explained. FIG. 5 is a schematic view of a side section of fastened portions of an engine 10B and a transmission 20B according to the second example. As shown in FIG. 5, in the second example, unlike the first example, a mating surface 13 of an engine block 11 and a mating surface 23 of a transmission housing 21 are fastened to each other directly by, for example, a fastening bolt 110 (not shown in FIG. 5). Meanwhile, a heat insulator 102 (second heat insulator) is stuck on a block surface 12 of the engine block 11, which serves as a first confronting surface facing a transmission housing 21 inside a damper chamber 22. A sheet-shaped film 102a is provided on a surface of the heat insulator 102 on the exposed side.

It is preferred that a material for the heat insulator 102 has low thermal conductivity so as to have heat insulating performance even in a narrow opening. It is preferred that thermal conductivity of the material is a hundredth or less of thermal conductivity of the engine block 11 and the transmission housing 21, or 1.0 W/mK or lower to be specific. Specific examples of the material for the heat insulator 102 include epoxy resin, unsaturated polyester, melamine resin, phenol resin, urethane resin, or a porous material containing air layers inside. When the porous material is used as the heat insulator 102, use of only the porous material causes an increase in heat exchanging areas between a surface of the porous material and air. Thus, it is preferred that the sheet-shaped film 102a, which is made of, for example, Al, is stuck on a surface of the heat insulator 102 made of the porous material. By sticking the sheet-shaped film 102a onto the surface of the porous material on the exposed side, the surface on the exposed side is smoothed, and air does not enter inside the porous material, thereby further improving heat insulation effect by the heat insulator 102. From the point of view of improvement of heat insulating performance, it is preferred that the sheet-shaped film 102a is provided on the surface of the heat insulator 102 whether or not the heat insulator 102 is made of the porous material. Further, the heat insulator 102 may have various film structures such as a structure with a single film of a heat insulation material, a structure made of a plurality of stacked layers of films made of a heat insulation material, and a structure in which at least one of the layers of the films is made of a heat insulation material and the rest of the films are made of a non-heat insulation material. Further, an adhesive or the like may be applied to at least one surface of the heat insulator 102. The rest of the structure is similar to that of the first example.

There are rotators inside the damper chamber 22 between the engine block 11 and the transmission housing 21. The rotators include a flywheel 16 and a damper 25 and rotate at high speed. As the flywheel 16 and the damper 25 rotate at high speed, air inside the damper chamber 22 rotates, following rotation of the rotators. Due to the rotation of air, heat dissipation from the engine block 11 to air by convection is promoted. On the contrary, by providing the heat insulator 102 on the block surface 12 of the engine block 11, it is possible to reduce heat dissipation from the engine block 11 to air inside the damper chamber 22. Because of this, it is possible to greatly restrain thermal conduction from the engine block 11 to the transmission housing 21 while improving heat retention of the engine 10B. Further, by sticking the heat insulator 102 onto the block surface 12, heat dissipation is restrained. Thus, an apparent heat capacity of the engine 10B including the heat insulator 102 increases, thereby improving a heat retention effect of the engine 10B.

Figure 6:
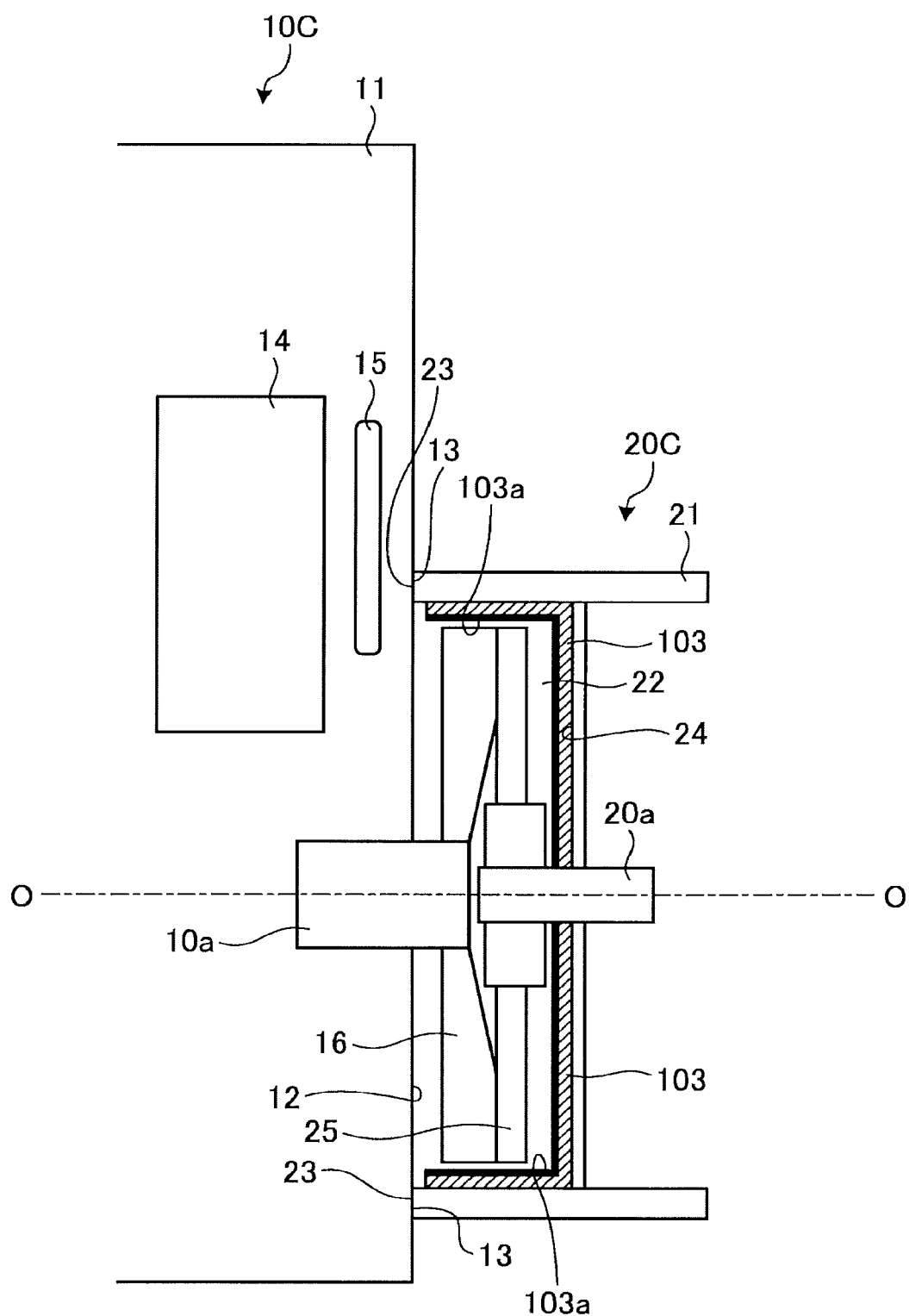
FIG. 6 is a schematic view of a side section of fastened portions of an engine and a transmission according to a third example of the disclosure.

Next, the third example is explained. FIG. 6 is a schematic view of a side section of fastened portions of an engine 10C and a transmission 20C according to the third example. As shown in FIG. 6, in the third example, unlike the first example, a mating surface 13 of an engine block 11 and a mating surface 23 of a transmission housing 21 are directly fastened to each other by, for example, a fastening bolt 110 (not shown in FIG. 6). Also, unlike the second example, a heat insulator 103 is provided on a housing surface 24 of the transmission housing 21, which serves as a second confronting surface facing the engine block 11 inside a damper chamber 22. A sheet-shaped film 103a is provided on a surface of the heat insulator 103 on the exposed side. Here, the heat insulator 103 and the film 103a are structured similarly to the heat insulator 102 and the film 102a according to the second example. The rest of the structure is similar to that of the first and second examples.

Further, as a flywheel 16 and a damper 25 inside the damper chamber 22 rotate at high speed, air inside the damper chamber 22 rotates, following the rotation. Due to this rotation of air, heat exchange from air inside the damper chamber 22 to the transmission housing 21 by convection happens. On the contrary, by providing the heat insulator 103 on the housing surface 24 of the transmission housing 21, thermal conduction from air inside the damper chamber 22 to the transmission housing 21 is restrained, thereby reducing a quantity of heat that moves. Because of this, it becomes easier to maintain the transmission 20C at low temperature, and, as a result, it is possible to improve heat retention of the engine 10C.

Figure 7:
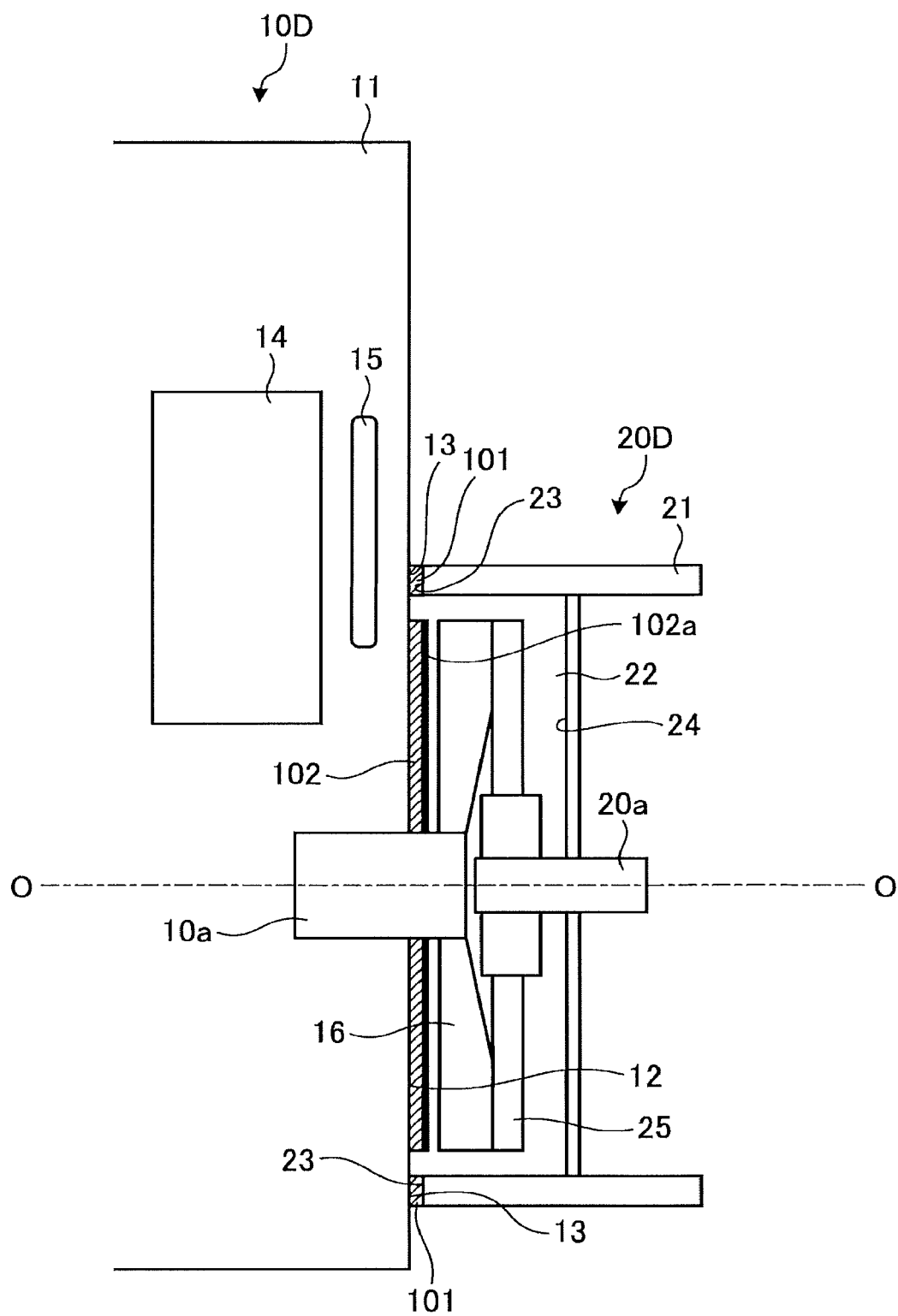
FIG. 7 is a schematic view of a side section of fastened portions of an engine and a transmission according to a fourth example of the disclosure.

Next, the fourth example is explained. FIG. 7 is a schematic view of a side section of fastened portions of an engine 10D and a transmission 20D according to the fourth example. As shown in FIG. 7, in the fourth example, similarly to the first example, a heat insulator 101 is provided between a mating surface 13 of an engine block 11 and a mating surface 23 of a transmission housing 21. In FIG. 7, a fastening bolt 110 and so on are not shown. Further, in the fourth example, similarly to the second example, a heat insulator 102, which includes a sheet-shaped film 102a on a surface on the exposed side, is stuck on a block surface 12 of the engine block 11 on the transmission housing 21 side inside a damper chamber 22. Here, the rest of the structure and details of a material for the heat insulators 101, 102 are similar to those of the first and second examples, and a material for the film 102a is similar to that of the second example.

In the fourth example, the heat insulators 101, 102 are provided between the mating surface 13 of the engine block 11 and the mating surface 23 of the transmission housing 21, and on the block surface 12 of the engine block 11 on the transmission housing 21 side inside the damper chamber 22, respectively. By providing the heat insulator 101 between the mating surfaces 13, 23, it is possible to restrain solid body thermal conduction from the engine block 11 to the transmission housing 21 through the mating surfaces 13, 23. Meanwhile, as solid body thermal conduction is restrained, temperature of the block surface 12 of the engine block 11 becomes higher compared to a case where the heat insulator 101 is not provided between the mating surfaces 13, 23. Therefore, a quantity of heat that moves from the engine block 11 to air inside the damper chamber 22 becomes relatively large. By sticking the heat insulator 102 on the block surface 12 of the engine block 11 in order to address this, it is possible to reduce heat dissipation from the engine block 11 to air inside the damper chamber 22. Thus, in comparison to the first and second examples, it is possible to largely restrain thermal conduction from the engine block 11 to the transmission housing 21 while improving heat retention of the engine 10D.

Figure 8:
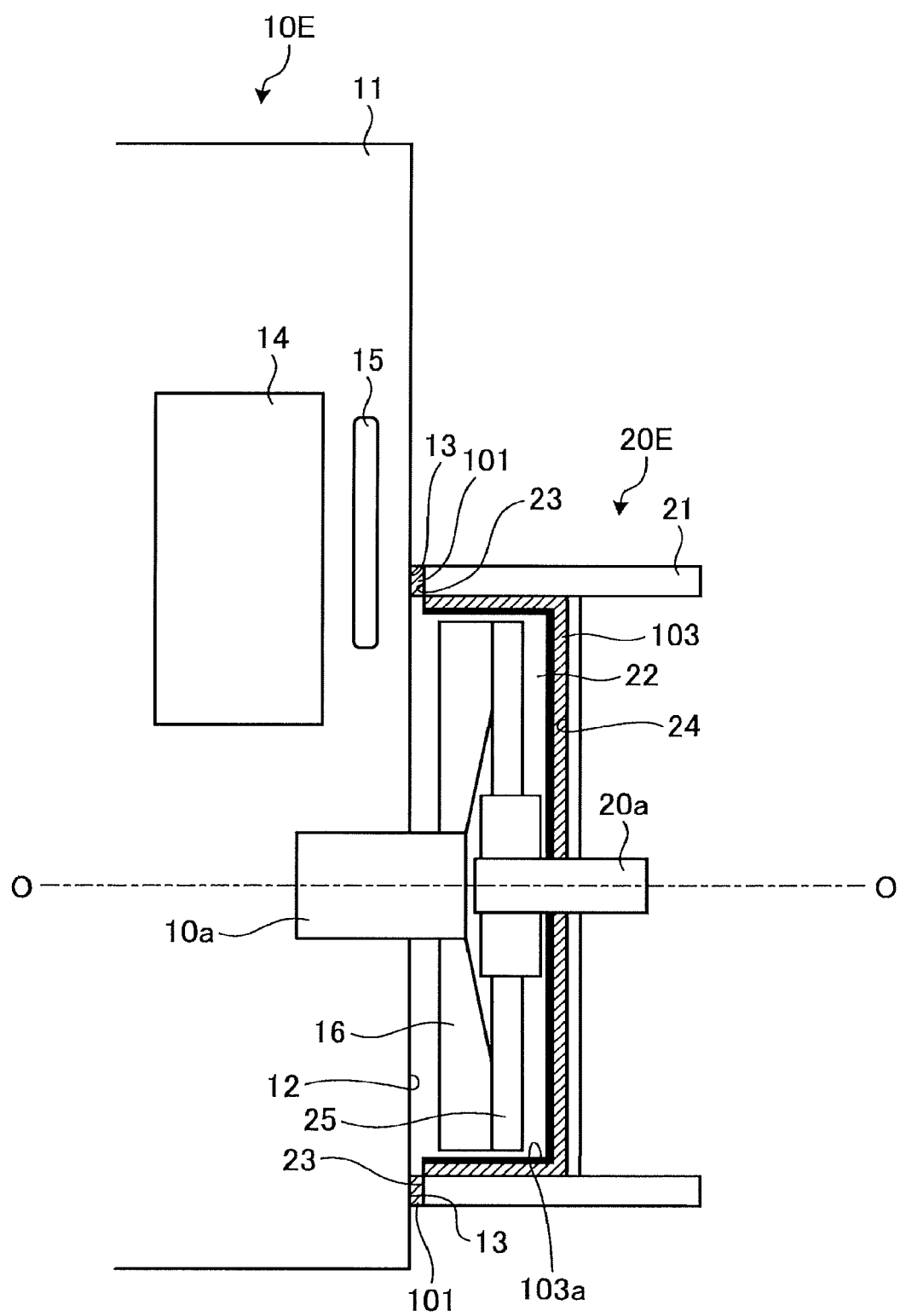
FIG. 8 is a schematic view of a side section of fastened portions of an engine and a transmission according to a fifth example of the disclosure.

Next, the fifth example is explained. FIG. 8 is a schematic view of a side section of fastened portions of an engine 10E and a transmission 20E according to the fifth example. As shown in FIG. 8, in the fifth example, similarly to the first example, a heat insulator 101 is provided between a mating surface 13 of an engine block 11 and a mating surface 23 of a transmission housing 21. In FIG. 8, the fastening bolt 110 and so on are not shown. Further, in the fifth example, similarly to the third example, a heat insulator 103, which includes a sheet-shaped film 103a on a surface on the exposed side, is stuck on a housing surface 24 of the transmission housing 21 on the engine block 11 side. The rest of the structure is similar to those of the first to third examples.

In the fifth example, heat insulators 101, 103 are provided between the mating surface 13 of the engine block 11 and the mating surface 23 of the transmission housing 21, and on the housing surface 24 of the transmission housing 21 on the engine block 11 side. By providing the heat insulator 101 between the mating surfaces 13, 23, it is possible to restrain the solid body thermal conduction from the engine block 11 to the transmission housing 21. Meanwhile, as the solid body thermal conduction is restrained, a quantity of heat transferred from the engine block 11 to air inside a damper chamber 22 becomes relatively large compared to a case where the heat insulator 101 is not provided between the mating surfaces 13, 23. Accordingly, temperature inside the damper chamber 22 becomes high, and a quantity of heat that moves to the transmission housing 21 through air inside the damper chamber 22 becomes relatively large. Further, as a flywheel 16 and a damper 25 inside the damper chamber 22 rotate at high speed, air inside the damper chamber 22 rotates following this rotation, and heat exchange due to convection happens. By providing the heat insulator 103 on the housing surface 24 of the transmission housing 21 in order to address these phenomena, it is possible to restrain thermal conduction from air inside the damper chamber 22 to the transmission housing 21, thereby reducing a quantity of heat that moves. Because of this, compared to the first example and the third example, it becomes easier to maintain the transmission 20E at low temperature and heat retention of the engine 10E is improved.

Figure 9:
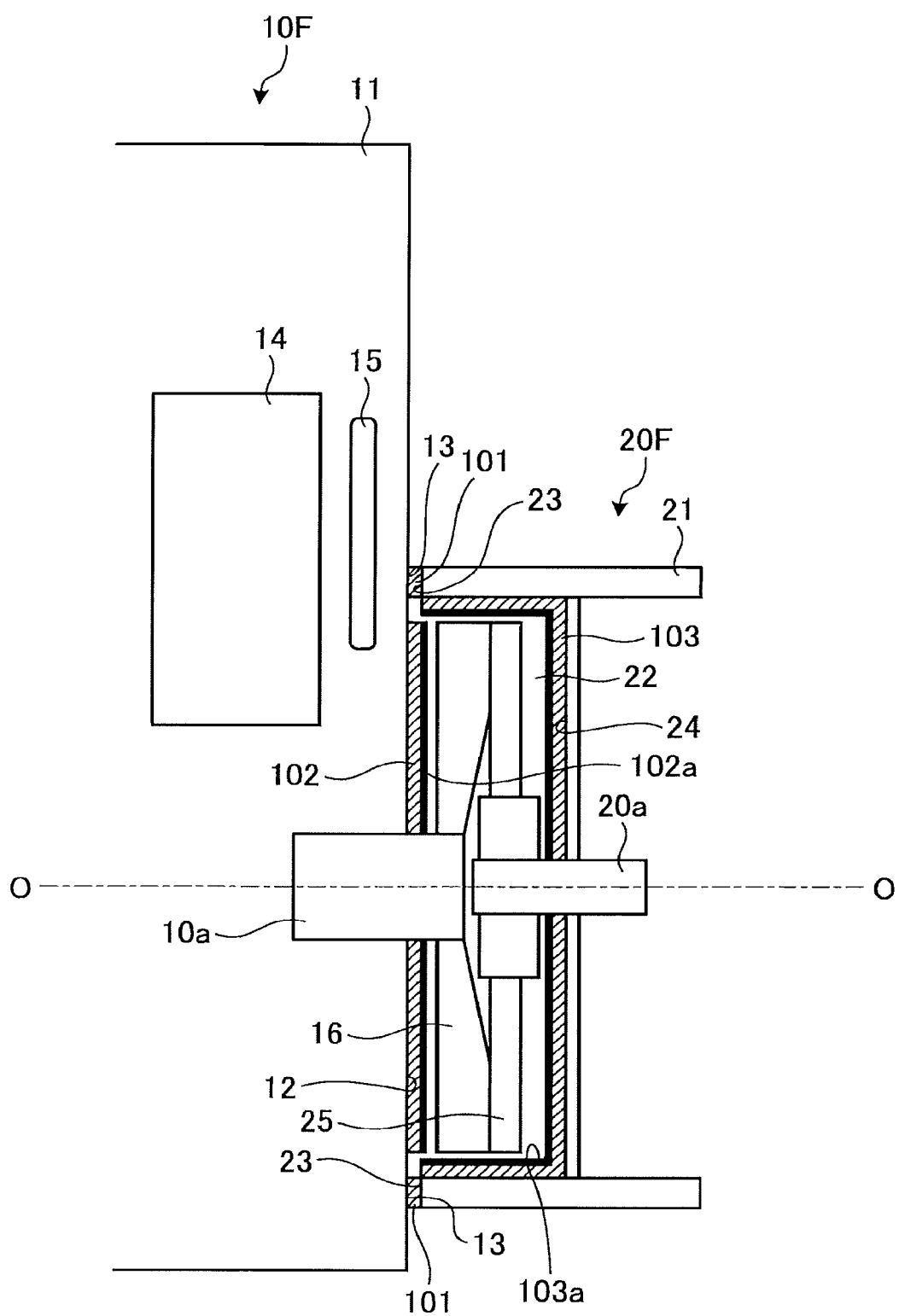
FIG. 9 is a schematic view of a side section of fastened portions of an engine and a transmission according to a sixth example of the disclosure.

Next, the sixth example is explained. FIG. 9 is a schematic view of a side section of fastened portions of an engine 10F and a transmission 20F according to the sixth example. As shown in FIG. 9, in the sixth example, similarly to the first example, a heat insulator 101 is provided between a mating surface 13 of an engine block 11 and a mating surface 23 of a transmission housing 21. In FIG. 9, the fastening bolt 110 and so on are not shown. Also, in the sixth example, similarly to the second example, a heat insulator 102, which includes a sheet-shaped film 102a provided on a surface on the exposed side, is stuck on a block surface 12 of the engine block 11. Further, in the sixth example, similarly to the third example, a heat insulator 103, which includes a sheet-shaped film 103a provided on a surface on the exposed side, is stuck on a housing surface 24 of a transmission housing 21. The rest of the structure is similar to those of the first to third examples.

In the sixth example, the heat insulators 101, 102, 103 are provided between the mating surface 13 of the engine block 11 and the mating surface 23 of the transmission housing 21, on the block surface 12 of the engine block 11, and the housing surface 24 of the transmission housing 21, respectively. By providing the heat insulator 101 between the mating surfaces 13, 23, it is possible to restrain solid body thermal conduction from the engine block 11 to the transmission housing 21. Meanwhile, as the solid body thermal conduction is restrained, temperature of the block surface 12 of the engine block 11 becomes higher than a case where the heat insulator 101 is not provided between the mating surfaces 13, 23. By providing the heat insulator 102 on the block surface 12 in order to address this, thermal conduction from the block surface 12 to air inside the damper chamber 22 is restrained, thereby reducing quantity of heat that moves. Moreover, by providing the heat insulator 103 (third heat insulator) on the housing surface 24 of the transmission housing 21, thermal conduction from air inside the damper chamber 22 to the transmission housing 21 is restrained, thereby reducing a quantity of heat that moves. Due to these, it becomes even easier to maintain the transmission 20F at low temperature and improve heat retention of the engine 10F compared to the fourth example and the fifth example.

Figure 10:
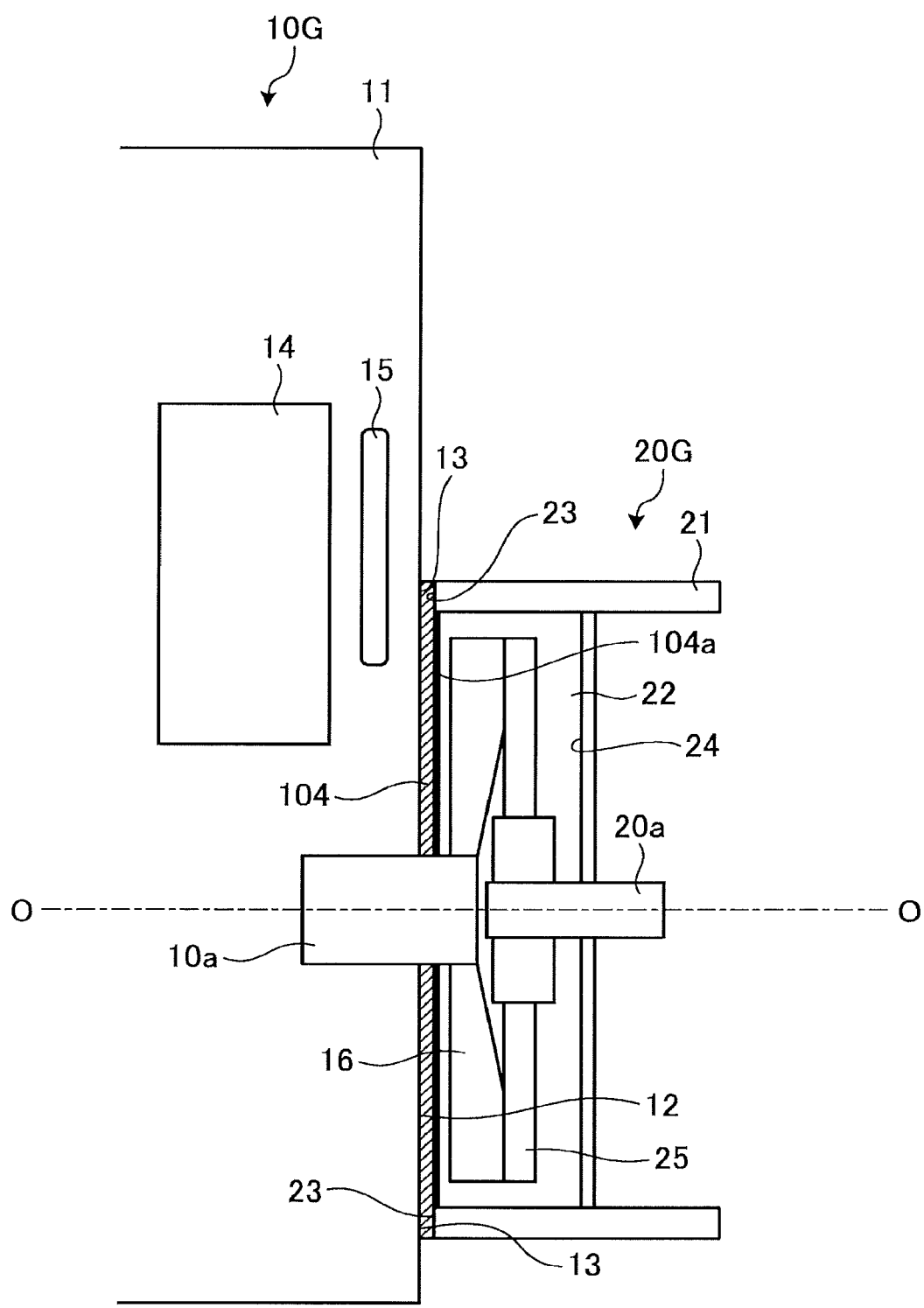
FIG. 10 is a schematic view of a side section of fastened portions of an engine and a transmission according to a seventh example of the disclosure.

Next, the seventh example is explained. FIG. 10 is a schematic view of a side section of fastened portions of an engine 10G and a transmission 20G according to the seventh example. As shown in FIG. 10, in the seventh example, a single body of a heat insulator 104 (forth heat insulator) is provided between a mating surface 13 of an engine block 11 and a mating surface 23 of a transmission housing 21 and also on a block surface 12 of the engine block 11. In FIG. 10, the fastening bolt 110 and so on are not shown. Further, a sheet-shaped film 104a is provided at least on a part of the heat insulator 104, the part being in contact with air inside the damper chamber 22. The film 104a may also be provided between the mating surfaces 13, 23. Here, the heat insulator 104 is constructed similarly to the heat insulators 101, 102, and its preferred material is, to be specific, epoxy resin, unsaturated polyester, melamine resin, phenol resin, or a porous material that has air layers inside. Further, the film 104a is constructed similarly to the film 102a in the fourth example, and the rest of the structure is also similar to that of the fourth example.

The heat insulator 104 according to the seventh example is structured by integrating the heat insulator 101 and the heat insulator 102 according to the fourth example. Because of this, it is possible to reduce the number of components of the power train, and it is also possible to obtain similar effects to those in the fourth example. Further, when assembling components of an engine 10G, the heat insulator 104, and components of the transmission 20G, it is possible to fix the heat insulator 104 to the block surface 12 of the engine block 11 with a single operation. Further, it is possible to assemble the components of the transmission 20G after the heat insulator 104 is fixed to the block surface 12. Because of this, it is possible to reduce operation processes compared to the fourth example, and, since the heat insulator 104 is fixed in advance, it is possible to improve accuracy in positioning holes through which the fastening bolt 110 goes when fastening the engine 10G and the transmission 20G.

Figure 11:
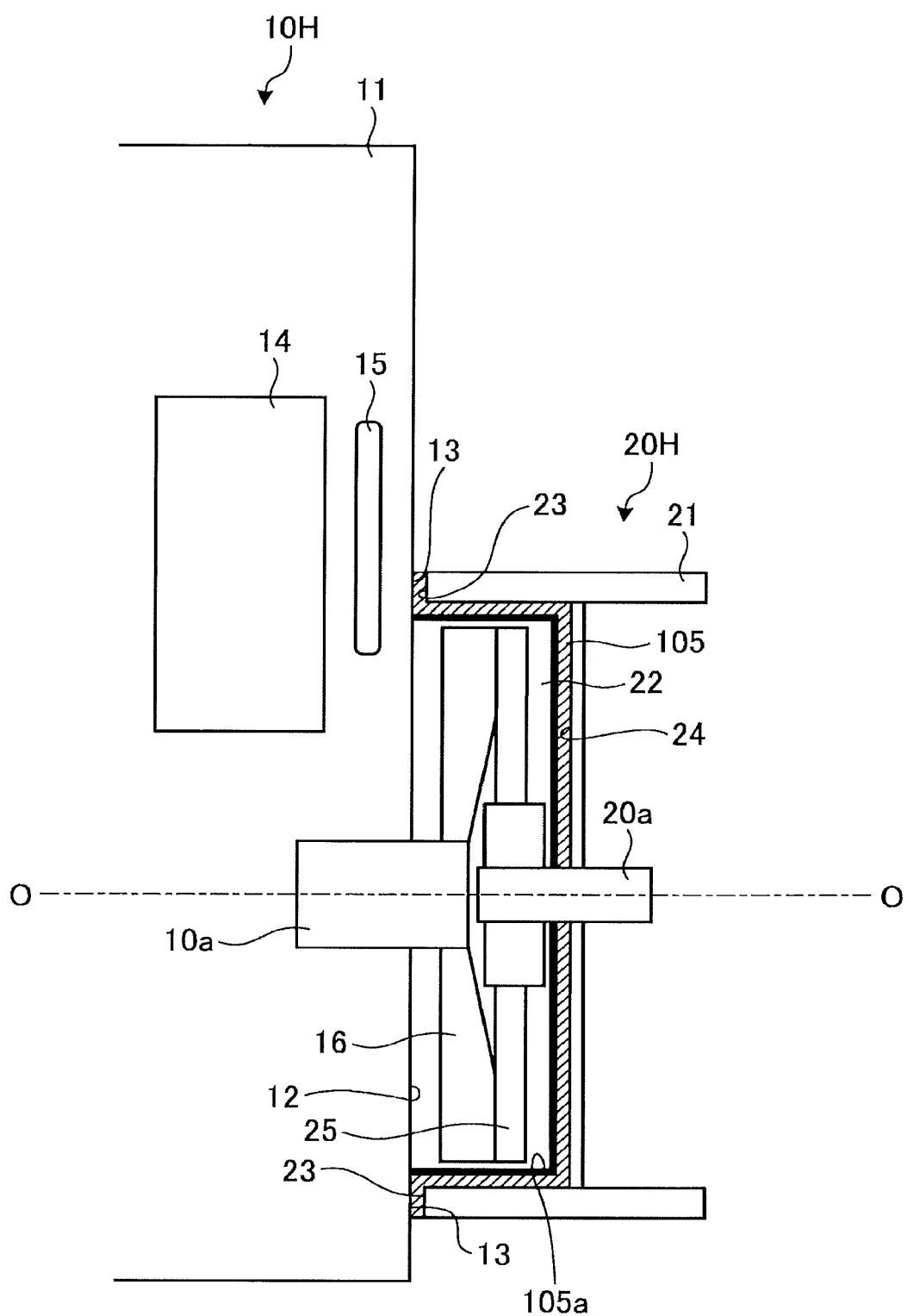
FIG. 11 is a schematic view of a side section of fastened portions of an engine and a transmission according to an eighth example of the disclosure.

Next, the eighth example is explained. FIG. 11 is a schematic view of a side section of fastened portions of an engine 10H and a transmission 20H according to the eighth example. As shown in FIG. 11, in the eighth example, a single body of heat insulator 105 is provided between a mating surface 13 of an engine block 11 and a mating surface 23 of the transmission housing 21, and on a housing surface 24 of the transmission housing 21. In FIG. 11, the fastening bolt 110 and so on are not shown. Also, a sheet-shaped film 105a is provided at least on a part of the heat insulator 105 (fifth heat insulator), the part being in contact with air inside the damper chamber 22. The film 105a may also be provided between the mating surfaces 13, 23. Here, the heat insulator 105 is structured similarly to the heat insulators 101, 103, and its preferred material is, to be specific, epoxy resin, unsaturated polyester, melamine resin, phenol resin or a porous material having air layers inside. Further, the film 105a is structured similarly to the film 103a of the fifth example, and the rest of the structure is similar to that of the fifth example.

The heat insulator 105 according to the eighth example is structured by integrating the heat insulator 101 and the heat insulator 103 according to the fifth example. Because of this, it is possible to reduce the number of components of the power train, and obtain similar effects to those of the fifth example. Further, when assembling components of the engine 10H, the heat insulator 105, and components of the transmission 20H, it is possible to fix the heat insulator 105 to the housing surface 24 of the transmission 20H with a single operation, and it is also possible to fix the heat insulator 105 by using the fastening bolt 110 (not shown in FIG. 11). Moreover, it is possible to assemble the components of the engine 10H after the heat insulator 105 is fixed to the housing surface 24. Thus, it is possible to reduce operation processes compared to the fifth example, and, since it is possible to fix the heat insulator 105 to the housing surface 24 by the fastening bolt 110 in advance, it is possible to improve accuracy in positioning holes through which the fastening bolt 110 goes when fastening the engine 10H and the transmission 20H.

Next, the ninth example is explained. FIG. 12A is a schematic view of a side section of fastened portions of an engine 10I and a transmission 20I according to the ninth example, and FIG. 12B is a schematic plan view of a heat insulator in FIG. 12A, seen from the right side on the sheet surface. In FIG. 12A, the fastening bolt 110 and so on are not shown. Further, the shape of a heat insulator 106 shown in FIG. 12B is simplified although the actual shape goes along the shapes of the mating surfaces 13, 23 (see FIG. 2 and FIG. 3).

As shown in FIG. 12A and FIG. 12B, in the ninth example, the heat insulator 106 is provided selectively in a portion below a lower end of the water jacket 15 between a mating surface 13 of an engine block 11 and a mating surface 23 of a transmission housing 21 along the vertical direction. A material of the heat insulator 106 is similar to that of the heat insulator 101 according to the first example, and the rest of the structure is similar to that of the first example.

Normally, when the vehicle Ve is in a high-temperature state where the vehicle Ve travels in high-load and high-speed conditions, a difference in temperature happens between an upper part and a lower part of the engine 10I. This means that the water jacket 15 is provided in the upper part of the engine 10I, and cooling water cooled by a radiator (not shown) circulates inside the water jacket 15. Therefore, in the upper part of the engine 10I, especially around the water jacket 15, temperature is lower than the lower part of the engine 10I and the transmission 20I. On the other hand, temperature of the lower part of the engine 10I becomes higher than that of the transmission 20I side due to engine oil heated by a combustion chamber 14.

In consideration of the above-mentioned phenomenon, the heat insulator 106 according to the ninth example is provided in a part lower than the lower end of the water jacket 15 along the vertical direction, and insulates only the part of the engine 10I lower than the lower end of the water jacket 15. Because of this, it is possible not only to restrain thermal conduction from a high-temperature part of the engine block 11 of the engine 10I to the transmission housing 21 of the transmission 20I, but also conduct heat generated in the transmission 20I to the engine 10I side in the upper part of the engine 10I. Therefore, compared to the first example, it is possible to further improve cooling performance for the transmission 20I, and reduce the highest temperature reached by the transmission 20I.

According to the first embodiment of the disclosure explained so far, it is possible to improve heat retention of the engine 10 when the engine 10 is stopped after traveling. Therefore, when the engine 10 is started again, the engine 10 is able to start with high water and oil temperature. Therefore, it is possible to start control of an intermittent operation and an exhaust gas recirculation (EGR) system in the vehicle Ve at an early stage. Further, since the engine 10 is maintained at relatively high temperature, it is possible to reduce mechanical dragging inside the engine 10. Further, when a vehicle travels in a state where a high load is applied to the engine 10 and the transmission 20, it is possible to restrain thermal conduction to the transmission 20. Therefore, it is possible to improve cooling performance for the transmission 20, and, when an electric system is provided inside the transmission 20, it is possible to reduce its electrical loss.

Figure 13:
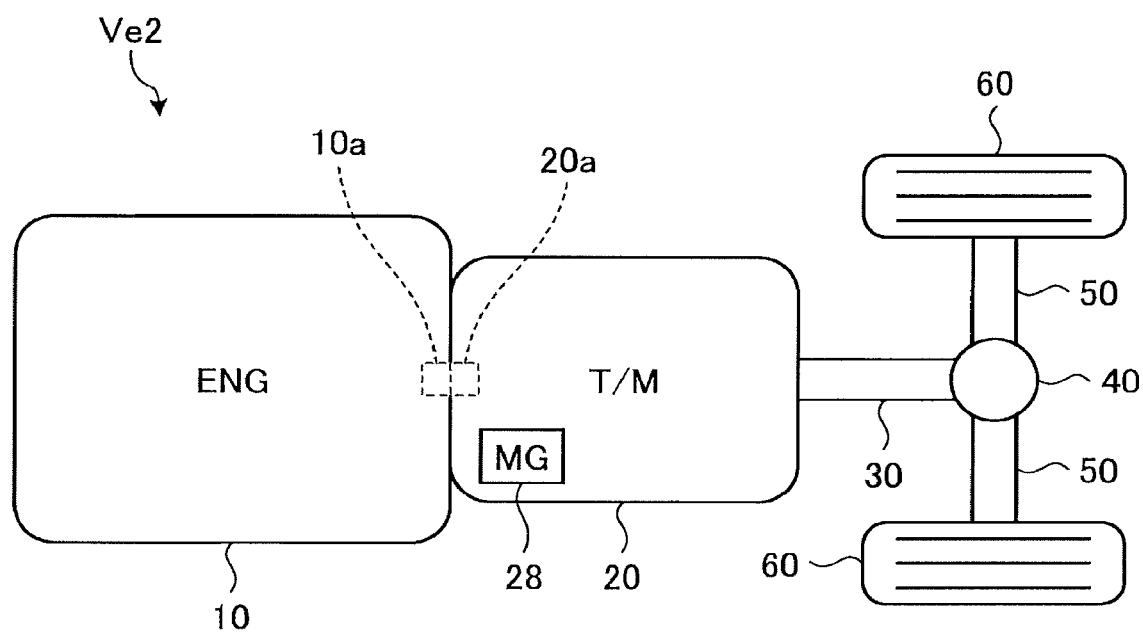
FIG. 13 is a schematic view of a structure of an HV according to a second embodiment of the disclosure.

Next, the second embodiment of the disclosure is explained. FIG. 13 is a schematic view of a structure of an HV according to the second embodiment. As shown in FIG. 13, unlike the first embodiment, in the HV Ve2 according to the second embodiment, while an electric motor (MG) 28 is provided inside a transmission 20, a starting device 70 is not provided. The vehicle is not limited to an HV, and may be a plug-in hybrid vehicle (PHV). The rest of the structure is similar to that of the first embodiment. Further, the first to ninth examples according to the foregoing first embodiment may also be applied to the HV Ve2 according to the second embodiment.

In the HV Ve2, since there are fewer parts that become heat sources compared to the vehicle Ve according to the first embodiment, it is harder to increase temperature of the engine 10 compared to the vehicle Ve. Therefore, an effect of improving heat retention of the engine 10 is observed more remarkably. This means that, by applying the foregoing first to ninth examples to the HV Ve2 to restrain thermal conduction from the engine 10 to the transmission 20, it is possible to improve heat retention of the engine 10. Therefore, compared to a case where the heat insulators 101 to 106 are not used, it is possible to shorten time until temperature of the engine 10 reaches given appropriate temperature. Further, in the HV Ve2, various electric parts represented by the electric motor MG are provided inside the transmission 20. By restraining the thermal conduction from the engine 10 to the transmission 20, it is possible to improve cooling performance of the transmission 20 and maintain the inside of the transmission 20 at low temperature, thereby reducing electric loss of the electric parts. Because of this, electrical efficiency of the electric motor 28 is improved. Therefore, it is possible to increase a distance that the HV and PHV are able to travel using the electric motor 28 as a power source. Moreover, since it is possible to maintain the inside of the transmission 20 at low temperature, degradation of magnetic force under a high-temperature environment, or so-called demagnetization, hardly happens even if magnet made of inexpensive fenite or the like is used for the electric motor 28. Therefore, it is possible to reduce cost of the electric motor 28, and thereby reducing cost for the transmission 20.

Further, in the HV Ve2, even when the engine 10 is stopped by ready off (main switch off) or ignition switch off from HV travel, it is possible to maintain temperature of oil and water of the engine 10 higher than a conventional case. Therefore, when the engine 10 is restarted after a few-hour stoppage, it is possible to start the engine 10 while temperature of oil and water is high. Because of this, it is possible to stabilize combustion of the engine at an early stage, and it is also possible to start control of an intermittent operation, an EGR and so on at an early stage. Further, since it is possible to reduce friction of the engine 10, fuel consumption in the HV Ve2 is reduced, thereby improving the fuel economy.

Next, a tenth example according to the second embodiment is explained. In the tenth example, oil having lower viscosity than conventional oil is used as transmission oil for the transmission 20 in the HV Ve2 according to the second embodiment. To be specific, for example, conventional transmission oil has kinetic viscosity of about 23 mm$^2$/s when oil temperature is 40° C. Meanwhile, in the tenth example, low-viscosity oil is used as transmission oil, which has kinetic viscosity of two-third or less of conventional kinetic viscosity. Specifically, for example, the viscosity is as low as about 15 mm$^2$/s.

When the first to ninth examples according to the foregoing first embodiment are applied to the HV Ve2 according to the second embodiment, thermal conduction from the engine 10 to the transmission 20 is restrained, thereby improving cooling performance of the transmission 20. Therefore, while electrical loss of electric parts is reduced, temperature of transmission oil is maintained low. Therefore, mechanical friction of the transmission 20 increases. Hence, as stated earlier, by setting viscosity of transmission oil low when oil temperature is low, for example, 40° C., it is possible to reduce loss due to friction of the transmission 20. Since loss in the transmission 20 is reduced, it is possible to further reduce oil temperature of the transmission 20, thereby reducing electrical loss of electric parts, represented by the electric motor 28, provided inside the transmission 20. Normally, in low-viscosity oil, viscosity becomes too low when oil temperature becomes too high. Then, contact points in gears and bearings easily fall into an out-of-oil state, and metal-to-metal contact increases. This could cause deterioration of durability. On the contrary, by restraining thermal conduction from the engine 10 to the transmission 20 by using the heat insulators 101 to 106 and maintaining the transmission 20 at low temperature, it is possible to further improve fatigue life of the transmission 20. Hence, mechanical loss and electrical loss of the transmission 20 at low temperature are reduced, and fuel consumption is also reduced. Thus, it is possible to achieve low fuel consumption, and further improve fatigue life of the transmission 20.

When the disclosure is applied to a vehicle, such as a PHV, which mainly travels in an EV travel mode, it is preferred that temperature of the transmission 20 is maintained relatively high. Therefore, by applying the third, fifth, sixth, and eighth examples to a vehicle that mainly travels in an EV travel mode, it is possible to reduce heat dissipation from the housing surface 24 of the transmission housing 21 to air in space between the engine block 11 and the transmission housing 21. Because of this, it is possible to improve heat retention of the transmission 20, thereby reducing mechanical loss of the transmission 20.

According to the second embodiment, the same effects to those of the first embodiment are obtained, and temperature inside the transmission 20 is maintained low, thereby improving cooling performance. Thus, while electrical loss of the electric motor 28 is reduced, it is possible to improve heat retention of the transmission 20 and reduce mechanical loss, thereby achieving low fuel consumption in an HV and a PHV.

The engine may include a water jacket provided inside the engine case, the heat insulator may be provided in a part lower than a lower end of the water jacket along a vertical direction of the engine case. According to the above configuration, it is possible not only to restrain thermal conduction from a high-temperature part of the engine block of the engine to the transmission housing of the transmission, but also conduct heat generated in the transmission to the engine side in the upper part of the engine. Therefore, it is possible to further improve cooling performance for the transmission, and reduce the highest temperature reached by the transmission.

Specific explanation has been given so far regarding the embodiments of the disclosure. However, the disclosure is not limited to the foregoing embodiments, and it is possible to make various modifications based on the technical ideas of the disclosure. For example, the numerical values stated in the foregoing embodiments are examples only, and different numerical values may be used as necessary.

What is claimed is:

1. A power train comprising:
an engine including an engine case;
a transmission including a transmission case that is fastened to the engine case by a fastening bolt;
an electric motor provided inside the transmission case; and
a heat insulator provided between a mating surface of the engine case and a mating surface of the transmission case, and being lower than thermal conductivity of the engine case and thermal conductivity of the transmission case,
wherein the fastening bolt passes through the heat insulator.

2. The power train according to claim 1, wherein the engine includes a water jacket provided inside the engine case, the heat insulator is provided in a part lower than a lower end of the water jacket along a vertical direction of the engine case.

3. The power train according to claim 1, wherein a material used for the heat insulator includes epoxy resin, unsaturated polyester, melamine resin, and phenol resin, which are reinforced by glass fiber, ceramics with high surface pressure resistance, and a porous material having air layers inside.

4. A power train comprising:
an engine including an engine case;
a crankshaft provided in the engine;
a transmission including a transmission case that is fastened to the engine case;
an electric motor provided inside the transmission case;
a heat insulator provided between the engine case and the transmission case, and being lower than thermal conductivity of the engine case and thermal conductivity of the transmission case;
a flywheel connected with the crankshaft; and
a damper connected with the flywheel, the flywheel and the damper being provided in a damper chamber between a block surface of the engine case and a housing surface of the transmission case,
wherein the heat insulator includes a first portion that is provided inside the damper chamber and on the block surface of the engine case, the first portion facing the flywheel, and the crankshaft passing through the first portion.

5. The power train according to claim 4, wherein:
the heat insulator includes a
second portion that is provided between a mating surface of the engine case and a mating surface of the transmission case.

6. The power train according to claim 5, wherein the first portion and the second portion of the heat insulator are formed as a single body.

7. The power train according to claim 4, wherein a sheet-shaped film is provided on a surface of the first portion of the heat insulator on an exposed side thereof.

8. A power train comprising:
an engine including an engine case;
a crankshaft provided in the engine;
a transmission including a transmission case that is fastened to the engine case;
an electric motor provided inside the transmission case;
a heat insulator provided between the engine case and the transmission case, and being lower than thermal conductivity of the engine case and thermal conductivity of the transmission case;
a flywheel connected with the crankshaft; and
a damper connected with the flywheel, the flywheel and the damper being provided in a damper chamber between a block surface of the engine case and a housing surface of the transmission case,
wherein the heat insulator includes a first portion that is provided inside the damper chamber and on the housing surface of the transmission case, and upper and lower surfaces of the transmission case, the first portion faces the crankshaft, the flywheel, and the damper, and an input shaft of the transmission passing through the first portion.

9. The power train according to claim 8, wherein the heat insulator includes a
second portion provided between a mating surface of the engine case and a mating surface of the transmission case.

10. The power train according to claim 9, wherein the heat insulator includes a third portion provided inside the damper chamber and on the block surface of the engine case, the third portion facing the flywheel, and the crankshaft passing through the third portion.

11. The power train according to claim 9, wherein the first portion and the second portion of the heat insulator are formed as a single body.

12. The power train according to claim 8, wherein a sheet-shaped film is provided on a surface of the first portion of the heat insulator on an exposed side thereof.

* * * * *